United States Patent [19]

Inoue

[11] 4,013,526
[45] Mar. 22, 1977

[54] ELECTROCHEMICAL GRINDING WITH A CONDUCTIVITY-CONTROLLED WHEEL ELECTRODE

[75] Inventor: Kiyoshi Inoue, Tokyo, Japan
[73] Assignee: Inoue-Japan Research Inc., Yokohama, Japan
[22] Filed: Apr. 14, 1975
[21] Appl. No.: 567,527
[52] U.S. Cl. .................... 204/129.46; 204/224 M
[51] Int. Cl.² ................................... B23P 1/00
[58] Field of Search ..... 204/129.2, 129.25, 129.43, 204/129.46, 129.5

[56] References Cited
UNITED STATES PATENTS

| | | | |
|---|---|---|---|
| 2,905,605 | 9/1959 | Keeleric et al. | 204/129.46 |
| 3,285,843 | 11/1966 | Blake | 204/129.46 |
| 3,616,427 | 10/1971 | Linden | 204/129.46 |
| 3,873,436 | 3/1975 | Inoue | 204/129.46 |

*Primary Examiner*—T. Tung
*Attorney, Agent, or Firm*—Karl F. Ross; Herbert Dubno

[57] ABSTRACT

An electrochemical grinding wheel of substantially uniform conductivity along its contoured grinding surfaces is modified to reduce the conductivity at locations generally parallel to the tool-feed direction (perpendicular to the machine surface) so that electrochemical removal of material from the workpiece occurs substantially only at those surfaces which are transverse to the tool-feed direction. This prevents overcutting of the workpiece.

12 Claims, 12 Drawing Figures

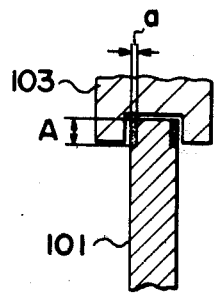
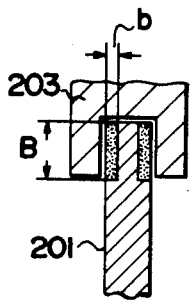
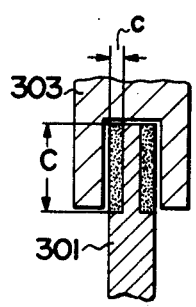
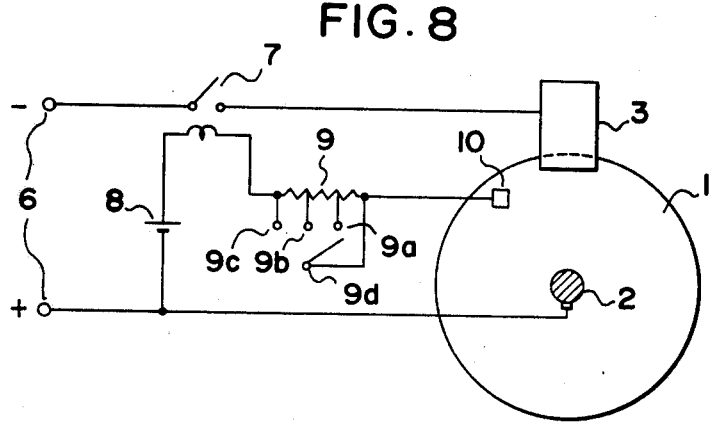

ELECTROCHEMICAL GRINDING WITH A CONDUCTIVITY-CONTROLLED WHEEL ELECTRODE

FIELD OF THE INVENTION

The present invention relates to electrochemical grinding and, more particularly, to an improvement in the electrochemical-abrasive grinding of a workpiece using a rotating electrically conductive wheel electrode formed on its revolving periphery with a machining surface of a contour corresponding to a shape to be imparted to the workpiece.

BACKGROUND OF THE INVENTION

In electrochemical grinding of this type, two distinct machining actions, in combination, are simultaneously carried out upon a workpiece: the mechanical abrading and scrubbing of the wheel surface against the workpiece and the electrolytic (anodic) dissolution of material from the workpiece by passage of a high-density electric current between the workpiece and the conductive or matrix portion of the wheel electrode across a gap produced by nonconductive abrasive protrusions on the conductive wheel matrix and supplied with a liquid electrolyte. As material removal proceeds in this manner, the wheel is advanced relatively to the workpiece and moved into the latter until a given depth is reached throughout the total machining region in the workpiece surface to produce a desired shape thereon.

Wheel electrodes, which should thus be satisfactory both in conductivity and mechanical properties, may be made by one of various techniques including: mixing abrasive particles with a conductive graphite or metallic powder and sintering the mixture into a coherent wheel body; mixing abrasive particles with powdery or flaky metal and bonding them together with the aid of a resinous binder; impregnating graphite, silver, copper or the like electrically conductive fine particles with a resinous binder into interstices of a porous abrasive body, e.g., vitrified or vitreous grinding wheel as prepared for mechanical grinding; and chemical plating of wall portions of interstices of such a porous abrasive body.

Heretofore, regardless of which one of these techniques is employed to prepare the wheel electrode or which type of wheel electrodes is to be utilized, efforts have been made to insure that the wheel has a uniform conductivity over the entire machining body or surface in order to afford an accurate shaping of the workpiece and better workpiece finish. In other words, it has been believed to be critical to insure that the abrasive protrusions projecting from the surface of the conductive wheel body be essentially of an equal thickness over the entire machining surface area of the wheel electrode independently of the nature and character of geometry of portions of the machining surface.

On the other hand, it has been recognized that in general, electromechanical grinding results are of a limited accuracy and much inferior to mechanical grinding in this respect. Thus, overcutting is a common occurrence in electrochemical grinding and could only be corrected by subsequent mechanical grinding with a separate grinding tool. Such overcutting typically occurs at corner, angular or edge portions of the machining surface and, even more significantly, at surface portions extending parallel to or essentially parallel to the feed direction of the wheel electrode relative to the workpiece or perpendicularly to the spindle carrying the rotating wheel electrode therearound.

OBJECT OF THE INVENTION

It is the object of the present invention to provide a method of increasing the accuracy of electrochemical grinding techniques while practically eliminating the need for the use of a separate grinding tool in the finishing operation.

SUMMARY OF THE INVENTION

According to the present invention, the method of electrochemically grinding a workpiece by a rotating electrically conductive, abrasive wheel electrode with a machining surface constituted by an electrically conductive matrix and a layer of electrically nonconductive abrasive protrusions projecting therefrom, comprises the steps of preparing said wheel electrode with the machining surface of a contour complementary to that to be imparted to the workpiece, treating the machining surface so as to impart thereto a conductivity which locally varies as a function of the geometric characteristics of the machining surface and electromechanically grinding the workpiece with the treated machining surface.

Advantageously, in carrying out the treatment step, electrically conductive material can be removed from the surface region of said wheel contour in the thickness of the conductive layer thereby controlled so as to obtain the desired conductive distribution in said machining surface.

While any other suitable method may be employed, it has been found to be advantageous to effect such material removal electromechanically by juxtaposing a treatment electrode with the machining surface of the wheel electrode in the presence of a liquid electrolyte therebetween and passing an electromechanical machining current between the treatment electrode which is poled cathodic and the wheel electrode poled anodically to electrolytically dissolve material from the surface region of the wheel contour.

In order to achieve a desired conductive distribution over the machining surface, one of several arrangements described hereinafter is advantageously employed.

In carrying out the wheel-conductivity control step, and electrochemical grinding machine utilized to perform the workpiece-machining operation can conveniently be utilized and may carry the wheel electrode in rotary position on the spindle. The treatment electrode may be brought into juxtaposition with this rotating wheel electrode.

The treatment electrode may be a stylus-type electrode which sweeps over the machining surface of the wheel electrode at varying speeds under a numerical control system to obtain a desired pattern of locally varied amount of electrolytic dissolution.

Alternatively, the treatment electrode may be constituted by a block-like body composed of graphite or the like readily machinable material. In this case, the body is first mechanically shaped into a contour complementary to the contour of the wheel electrode by feeding the body against the rotating wheel until a predetermined machining depth is attained. Then, after slight withdrawal in the feed direction, the shaped body is poled cathodic forming the treatment electrode with respect to the machining surface of the wheel electrode which is poled anodic and the treatment operation proceeds for a given period of time. This embodiment is highly suitable to eliminate an undesirable overcutting on those workpieces extending in parallel with or substantially in parallel with the feed direction of the wheel electrode relative to the workpiece in the electrochemical grinding operation. The graphite or the like body may be replaced by a bundle of needles or thin rods which may be shaped or arranged on the contoured machine surface of the wheel electrode.

BRIEF DESCRIPTION OF THE DRAWING

These and other objects, features and advantages of the present invention will be more readily appreciated from the following description thereof, reference being made to the accompanying drawing which shows various forms of the invention by way of example only and in which:

FIGS. 5 to 7 are diagrammatic sectional views illustrating a modification of the method illustrated in FIGS. 1 to 3;

FIG. 8 is a circuit diagram of a power supply with a control circuitry for carrying out the method illustrated in FIGS. 5 to 7;

SPECIFIC DESCRIPTION

As noted earlier, a significant problem in electrochemical grinding processes which has made the machining results undesirably of a limited accuracy is overcutting which most frequently takes place on the transverse surfaces of the workpiece; i.e., the surfaces extending parallel to or substantially parallel to the feed direction of the workpiece relative to the grinding wheel. This problem is overcome in accordance with the present invention by treating a uniformly conductivity-imparted electrochemical abrasive wheel electrode in such a manner that those surface portions of the abrasive wheel electrode which extend perpendicularly or substantially perpendicularly to the wheel axis are rendered electrically less conductive than machining surface portions of the abrasive wheel electrode and thereafeter electrochemically grinding a workpiece with an abrasive wheel electrode so treated. One embodiment of the wheel-treating method in this manner is described with reference to FIGS. 1 to 4.

In these Figures, an electrochemical abrasive wheel electrode 1 is shown rotatably driven on its shaft 2 extending horizontally. The shaft 2 may conveniently be the spindle of a machine for electrochemically grinding a workpiece here not shown, the machine being provided with an electrolyte collection trough or receptacle 10. The abrasive wheel electrode 1 may be contoured by mechanically dressing it initially when a contour other than simple cylindrical contour is desired and may also be a wheel shaped in a sintering or other bonding mold. When a contour other than simple cylindrical contour is to be imparted to the workpiece, the present invention in a preferred embodiment employs a vitrified or vitreous abrasive wheel to which electric conductivity is imparted by chemical plating because of its excellent abrasiveness, mechanical dressability and uniform conductivity.

Figure 1:
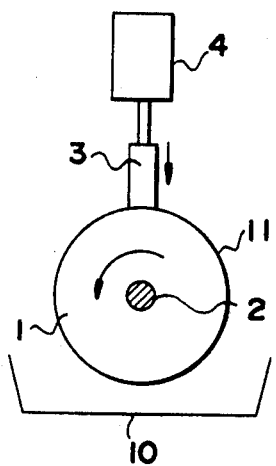
FIGS. 1 to 3 are diagrammatic elevational views illustrating a certain form of the method of forming a machining surface with locally controlled conductivity of an electrochemical grinding wheel.
Figure 2:
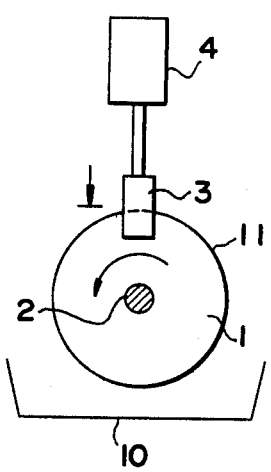
Figure 3:
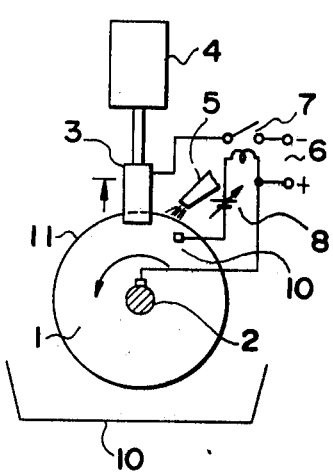

An electrically conductive block 3 is disposed above the wheel 1 and is mounted for movement in the vertical direction by a cylinder-piston motor arrangement 4. This block is advantageously composed of graphite and may be a semi-sintered metal or any other electrically conductive, relatively soft or readily mechanically machinable material. The block 3 is initially machined mechanically as a workpiece by the abrasive wheel electrode 1 and subsequently serves as an electrochemical treatment electrode for the latter (FIGS. 1 and 2). In FIG. 3 there are shown an electrolyte supply nozzle 5 and a power supply 6 for effecting the electrochemical treatment. This power supply which may conveniently be an electrochemical grinding power supply is connectable via a switch 7 across the treatment electrode 3 and the abrasive wheel electrode 1 with the latter being poled as anodic.

Figure 4:
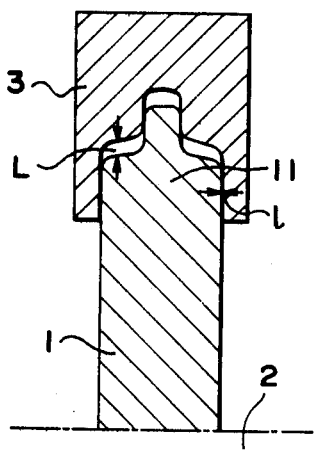
FIG. 4 is a diagrammatic enlarged sectional view illustrating the wheel electrode and the treatment electrode in the stage of FIG. 3.
Figure 4A:
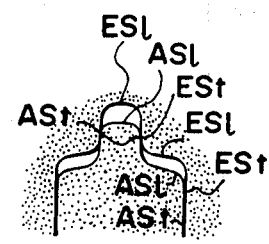
FIGS. 4a and 4b are diagrams illustrating details of FIG. 4.

In the initial step of the operational sequence, the motor arrangement 4 displaces the block 3 downwardly (FIG. 1) so that the block 3 is ground mechanically by the rotating abrasive wheel electrode 1 and the downward displacement is continued until the shape of block 3 becomes complementary to the grinding surface 11 of the abrasive wheel electrode 1 and a predetermined grinding depth is reached (FIG. 2). Thereupon the block 3 is withdrawn slightly so that a spacing L is created between the confronting surfaces in the longitudinal direction (i.e., radial direction of the wheel) $ES_l$, $AS_l$ while a minute gap spacing $l$ created during the mechanical grinding operation remains between the surfaces in the transverse direction $ES_t$, $AS_t$ without increase as indicated in FIG. 4 and 4a, where $L>>l$.

When this condition is established, the electrochemical treatment of the machining surface 11 of the abrasive wheel electrode 1 may be commenced by the continued rotation of the wheel 1 and delivery upon the machining surface 11 of a liquid electrolyte which can conveniently be the same electrolyte as used in a subsequent electrochemical grinding operation. The switch 7 is closed to connect the shaped block or treatment electrode 3 with the negative terminal of the power source 6 whose positive terminal is connected with the wheel electrode 1 to apply an electrochemical grinding current across the juxtaposed surfaces of the wheel 1 and the shaped block fixedly positioned as indicated in the presence of the electrolyte therebetween. The electric current passes preferentially transversely through the surfaces $AS_t$ and $ES_t$ with little current flowing between the surface $AS_l$ and $ES_l$ so that anodic dissolution or material removal takes place preferentially in the wheel surface regions $AS_t$ and more deeply in the latter regions than in the regions $AS_l$. The resulting abrasive wheel electrode 1 has greater thickness of abrasive protrusions exposed and hence less conductivity in the regions $AS_t$ than in the regions $AS_l$.

When the electrochemical grinding of a workpiece is carried out with so treated abrasive wheel electrode surface 11 (see FIG. 4b), the electrochemical grinding current will flow predominantly or preferentially in the radial direction or through the wheel surface portions $AS_l$ having greater conductivity or smaller thickness of abrasive protrusions projecting therefrom in contact with workpiece surface portions $WS_l$ directly juxtaposed therewith and little or essentially no machining current will flow in the transverse direction or through the wheel surface portions $AS_t$ having lower conductivity or greater thickness of abrasive protrusions projecting from them in contact with their confronting workpiece surfaces $WS_t$. In the latter regions the wheel surface 11 effects practically only mechanical smoothening and spacing functions. In this manner the occurrence of overcutting which has been probmatical can be effectively avoided.

It should be noted that the distance of withdrawal of the member 3 away from the wheel surface 11 (L) may be in the range between 0.1 to 10 mm, a particular value depending on the nature of the actual contour and electrochemical grinding operation desired. A timer may be utilized in association with a constant output direct-current source as the machining power source 6 so that after lapse of a predetermined time duration the switch 7 may be thereby opened automatically to terminate the wheel treatment operation to insure removal of a predetermined amount of material from the wheel surfaces $AS_t$ and to a predetermined depth. The material removal depth or the thickness of nonconductive abrasive protrusions exposed in these surface portions (in the transverse direction) should be at least 100 microns and is preferably in the order of mm. In comparison, the thickness of nonconductive abrasive protrusions in the longitudinal or radial direction is limited to a value ranging between 10 to 100 microns and preferably between 50 and 100 microns.

In the embodiment of FIGS. 5 to 7 in which abrasive wheel electrodes of cylindrical contour 101, 201 and 203 are shown treated by graphite or the like electrically conductive members 103, 203 and 303 which are previously shaped complementarily to said contour and respectively to depths which are approximately equal to the grinding depths A, B and C of workpieces in the subsequent electrochemical grinding operations, the thickness of material removal over the transverse surfaces of the wheel, $a$, $b$, $c$, is controlled to increase proportionately to or as a function of the electrochemical grinding depth A, B, C, where $A<B<C$ and $a<b<c$.

This can be accomplished by monitoring the variation of resistivity in the surface region of the wheel being subjected to the treatment operation and switching off the switch 7 in response to a predetermined rise of resistivity.

An exemplary circuit arrangement for such monitoring and switching control will be apparent from FIGS. 3 and 8. Here, the switch 7 for closure to connect the treatment electrode 3 to the negative terminal of the machining power supply 6 is constituted by a contact switch energized by an electromagnetic coil 7a connected in series with the one terminal of a power source 8 and with a monitoring electrode 10 via a selectable resistor element 9 including registor tap switches 9a, 9b and 9c and a movable arm switch 9d, the monitoring electrode 10 being disposed in light contact with the side face of the wheel electrode 1 at a relatively peripheral portion thereof. The other terminal of the power source 8 is connected with the shaft 2 carrying the wheel electrode 1.

Resistor taps 9a, 9b and 9c when in contact by the switch 9d are designed to establish the resistive values which deenergize the coil 7a to open the contact 7, respectively, when the resistance between the electrodes 10 and 2 becomes predetermined values corresponding to the amounts of material removal and thicknesses $(a)$, $(b)$, and $(c)$. Thus, with the tap 9a in contact by the switch 9d, a relatively slight amount of rise of the resistance concerned will cause the contact 7a to open to leave the nonconductive abrasive layer $(a)$ of a smallest thickness. Conversely, with the tap 9d coming in contact with the tap 9c, the contact 7 will be open only after the rise of the resistance reaches a highest value predetermined to permit the layer to be of a greatest nonconductive abrasive thickness $(c)$. With the tap 9b selected, the layer of a medium nonconductive abrasive thickness $(b)$ will result when a resistance value corresponding thereto is registered.

Figure 9:
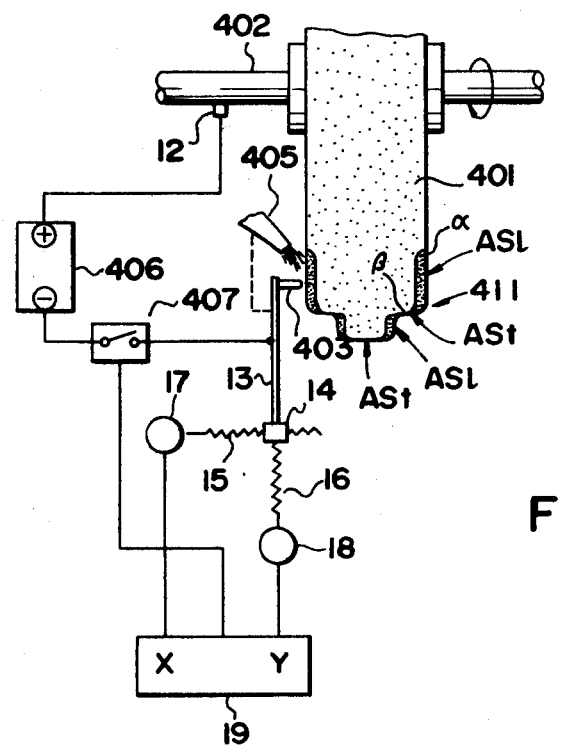
FIG. 9 is a diagrammatic view partly in section of an alternative system for obtaining an electrochemical grinding surface with locally controlled conductivity using a stylus electrode and a numerical control arrangement.

In the system of FIG. 9, an electrochemical abrasive wheel electrode 401 rotated on the spindle 402 which may here again be advantageously the spindle of the electrochemical grinder for grinding a workpiece is electrochemically treated by a stylus electrode 403 mounted on an stylus holder 13 which is connected via a switch 407 to the negative terminal of a power supply 406 of the type mentioned previously. The positive terminal of the power supply 406 is connected via a conducting brush 12 to the spindle 402. The machining electrolyte is delivered to the machining surface 411 of the wheel electrode 401 by a supply nozzle 405.

The wheel electrode surface 411 for treatment has, here again, surfaces $AS_l$ extending in the longitudinal direction or the radial direction of the wheel 401 as well as surfaces $AS_t$ extending in its transverse direction.

The electrode holder 13 is mounted on a carriage 14 displaced by a pair of lead screws 15 and 16 in the X and Y directions, respectively, which are in turn driven by pulse motors 17 and 18, respectively. The pulse motors 17 and 18 are actuated by command signals programmed in numerical control device 19 as in the conventional manner. The numerical control device 19 here also applies control signals to the switch 407 which may be an electronic switch such as a power transistor.

The wheel electrode 401 may be initially dressed mechanically to provide the contoured machining surface 411 as noted previously. In this embodiment, however, it is also possible to effect the contour-dressing and the conductivity control treatment simultaneously. In the latter case, the stylus electrode comprises an electrically conductive abrasive tool such as a metal bonded diamond tool having both electrochemical conductivity and mechanical machining ability.

In operation, the tool holder 13 is positioned to hold the stylus electrode 403 closely spaced apart from the conductive surface of the abrasive wheel electrode face 411 or in contact with the abrasive protrusions thereof and the switch 7 is turned on by a start signal issued from the numerical control device 19 to permit the electrochemical treatment current to be applied between the stylus electrode 403 and the wheel electrode 401 through the electrolyte. Metal is dissolved electrochemically from the wheel body leaving raising nonconductive abrasive protrusions from the machined conductive matrix or the receding conductive surface thereof.

The amount of metallic dissolution or machining is proportional to the integral of the electrochemical machining current with respect to time which thus determines the local conductivity of the machining face 411 or the thickness of the electrochemically metal stripped nonconductive abrasive protrusions or the depth of the receded conductive surface of the machining face 411. Accordingly, the numerical control device 19 is arranged to sweep the stylus electrode 403 at variable controlled programmed feed rates over the entire machining surface 411 of the wheel 401 to obtain a desired conductivity distribution thereon.

More particularly, when the stylus 403 is in juxtaposition with a surface portion $AS_l$ extending radially of the wheel 401 or in the direction perpendicularly or essentially perpendicularly to the axis of wheel 401, the stylus will be swept at a relatively low feed rate so that there a greater amount of metal dissolution may take place and a thicker layer of nonconductive abrasive protrusions $\alpha$ may be exposed above the conductive surface. Conversely, when the stylus 403 is in juxtaposition with a surface portion $AS_t$ extending transversely of the wheel 401, the stylus will be swept at a relatively high feed rate so that a lower amount of metal dissolution may be effected and a relatively thin layer of nonconductive abrasive protrusions $\beta$ may result above the conductive surface in these areas $AS_t$. As noted previously, the relative thick layer ($\alpha$) should be of a thickness of at least 100 microns and preferably in the order of mm whereas the relatively thin layer ($\beta$) should be of a thickness of 10 to 100 microns and preferably between 50 and 100 microns. As a result, resistivity in a range between 5 and 10 ohm-cm will be given in the region of ($\alpha$) whereas resistivity in a range between 0.1 and 1 ohm-cm in the region of ($\beta$).

In practice, when the stylus 403 is juxtaposed with a surface $AS_l$ as shown, the pulse motor 17 for the X-axis feed may be stopped and only the pulse motor 18 for the Y-axis feed may be driven and controlledly operated by low-frequency control pulses to sweep the stylus 403 at the reduced feed rate. After forming the nonconductive layer $\alpha$ of a thickness in the range described, when the stylus 403 comes to the region of $AS_t$, then the pulse motor 18 will be deactuated and the pulse motor 17 will be driven and operated by high-frequency drive pulses to sweep the stylus 403 at the high feed rate so that the nonconductive layer $\beta$ of a thickness in the range noted previously may be produced or may remain. The wheel 401 may be rotated at a given rpm during the sweeping operation.

Figure 4B:
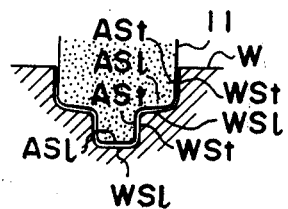
Figure 10:
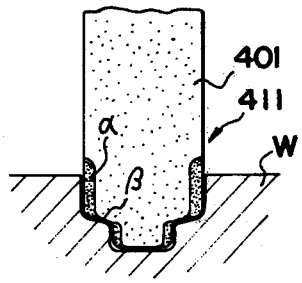
FIG. 10 is a diagrammatic sectional view illustrating a wheel surface treated by the system of FIG. 9 and a workpiece electrochemically ground thereby.

FIG. 10 which is similar to FIG. 4b illustrates a wheel electrode 401 having a machining surface 411 treated in the system of FIG. 9 and machining a workpiece W to the contour complimentary thereto. As already indicated, electrochemical material removal action is essentially confined to the radial direction of the wheel and across the surfaces $\beta$, and the mechanical finishing and scrubbing tool faces are provided by conductivity-controlled surface regions $\alpha$.

While in the foregoing description, reference is made to electrochemical dissolution as a preferred means of removing conductive material controlledly from the surface region of the wheel electrode, the material removal may be effected partly or wholly by any of other methods such as chemical etching, mechanical brushing and spark distintegration.

I claim:

1. A method of electrochemically grinding a workpiece by a rotating electrically conductive, abrasive wheel electrode with a machining surface constituted by an electrically conductive matrix and a layer of electrically nonconductive abrasive protrusions projecting therefrom, said method comprising the steps of:
   a. preparing said wheel electrode with the machining surface of a contour corresponding to a shape to be imparted to said workpiece,
   b. treating said machining surface by electrochemically solubilizing said conductive matrix at said machining surface so as to impart thereto a conductivity which locally varies as a function of the shape of said machining surface, and
   c. electrochemically grinding said workpiece with said treated machining surface.

2. The method defined in claim 1 wherein in step (b) electrically conductive material is removed from the surface region of said electrode and the thickness of said layer is thereby controlled so as to obtain the desired conductivity distribution in said machining surface.

3. The method defined in claim 1 wherein in step (a) said contour is formed on said wheel electrode by mechanically dressing the same.

4. The method defined in claim 3 wherein said steps (a) and (b) are carried out concurrently.

5. A method of electrochemical grinding which comprises the steps of:
   a. forming an electrochemical grinding wheel with a contoured machining surface and a substantially uniform electrical conductivity along said surface;
   b. selectively decreasing the electrical conductivity of portions of said surface extending generally parallel to a tool-feed direction by electrochemical solubilization of conductive material from said wheel;
   c. rotating said wheel in contact with a workpiece while supplying an electrolyte to the region of contact of said wheel with said workpiece and passing an electric current through said wheel and said workpiece to anodically solubilize portions of said workpiece juxtaposed with relatively more conductive portions of said surface; and
   d. feeding said wheel into said workpiece parallel to said direction by relatively displacing said wheel and said workpiece.

6. The method defined in claim 5 wherein said wheel is formed with said surface of substantially uniform conductivity in step (a) by chemically plating the wheel with metal.

7. A method of electrochemical grinding which comprises the steps of:
   a. forming an electrochemical grinding wheel with a contoured machining surface and a substantially uniform electrical conductivity along said surface;
   b. selectively decreasing the electrical conductivity of portions of said surface extending generally parallel to a tool-feed direction;
   c. rotating said wheel in contact with a workpiece while supplying an electrolyte to the region of contact of said wheel with said workpiece and passing an electric current through said wheel and said workpiece to anodically solubilize portions of said workpiece juxtaposed with relatively more conductive portions of said surface; and
   d. feeding said wheel into said workpiece parallel to said direction by relatively displacing said wheel and said workpiece, the conductivity of portions of said surface being reduced in step (b) by electrochemically solubilizing material from said surface.

8. The method defined in claim 7 wherein material is electrochemically solubilized from said surface by the steps of:
   $b_1$. mechanically grinding a conductive body with said wheel to impart to said body a contour complementary to that of said wheel;
   $b_2$. withdrawing said body as shaped in step ($b_1$) from said surface to form a gap therewith;
   $b_3$. supplying an electrolyte to said gap; and
   $b_4$. connecting said body and said wheel to an electrical source to anodically solubilize said material from said wheel with electrolyte supplied to said gap.

9. The method defined in claim 7 wherein material is electrochemically removed from said wheel by:
   $b_1$. juxtaposing the surface of said wheel parallel to said direction with a stylus;
   $b_2$. supplying an electrolyte to the stylus and the wheel in the region of juxtapose position thereof, and
   $b_3$. electrically connecting said stylus and said wheel to anodically solubilize said material from said wheel.

10. The method defined in claim 9, further comprising the step of dressing said wheel with said stylus.

11. The method defined in claim 9 further comprising the step of displacing said stylus generally parallel to said direction and controlling the degree of anodic solubilization of said material in accordance with the particular position of said stylus in the displacement thereof.

12. The method defined in claim 7, further comprising the steps of measuring the electrical conductivity of portions of said surface and terminating the removal of material therefrom upon the measured conductivity attaining a predetermined value.

* * * * *

UNITED STATES PATENT AND TRADEMARK OFFICE
CERTIFICATE OF CORRECTION

PATENT NO. : 4,013,526
DATED : March 22, 1977
INVENTOR(S) : Kiyoshi INOUE

It is certified that error appears in the above-identified patent and that said Letters Patent are hereby corrected as shown below:

In the heading, after line [21] insert:

-- [30] Foreign Application Priority Data

| 12 April 1974 | Japan | 49- 41,147 |
| 15 April 1974 | Japan | 49- 42,010 |
| 9 October 1974 | Japan | 49-116,696 -- . |

Signed and Sealed this

Seventh Day of June 1977

[SEAL]

Attest:

RUTH C. MASON
Attesting Officer

C. MARSHALL DANN
Commissioner of Patents and Trademarks